(12) United States Patent
Sinha

(10) Patent No.: US 8,600,314 B2
(45) Date of Patent: Dec. 3, 2013

(54) SYSTEM AND METHOD FOR SCANNING WIRELESS CHANNELS

(75) Inventor: Rajesh Kumar Sinha, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 205 days.

(21) Appl. No.: 13/272,157

(22) Filed: Oct. 12, 2011

(65) Prior Publication Data

US 2013/0095768 A1 Apr. 18, 2013

(51) Int. Cl.
*H04B 1/00* (2006.01)
*H04B 7/00* (2006.01)

(52) U.S. Cl.
USPC ............. 455/70; 455/434; 455/509; 370/329

(58) Field of Classification Search
USPC ................... 455/7, 70, 434, 509; 370/329
See application file for complete search history.

(56) References Cited

U.S. PATENT DOCUMENTS

| | | | |
|---|---|---|---|
| 8,351,848 B2 * | 1/2013 | Mohanty et al. | 455/11.1 |
| 2010/0099404 A1 * | 4/2010 | Khoo et al. | 455/433 |
| 2013/0033988 A1 * | 2/2013 | Dhanapal | 370/241 |

OTHER PUBLICATIONS

WGA Technical Working Group "WGA-D104", TWG MAC Editor Solomon Trainin, Carlos Cordeiro, TWG PHY Editor Assaf Kasher, Company: Intel (1) pp. 1-378 Jan. 23, 2011.

* cited by examiner

*Primary Examiner* — Tuan H Nguyen
(74) *Attorney, Agent, or Firm* — Farjami & Farjami LLP

(57) ABSTRACT

System and method for active scanning of wireless channels is described. An example method may include transmitting, by a first wireless device, a request to enter a sleep mode and a sleep mode schedule to a second wireless device, the sleep mode schedule specifying a sleep period for the first wireless device going to sleep, and scanning one or more wireless channels, by the first wireless device after transmitting the sleep mode schedule and during the sleep period, to find a third wireless device for communication with the first wireless device. The method may also include communicating, by the first wireless device, during the sleep period, with the third wireless device. Such a scan may be a passive scan or an active scan.

20 Claims, 4 Drawing Sheets

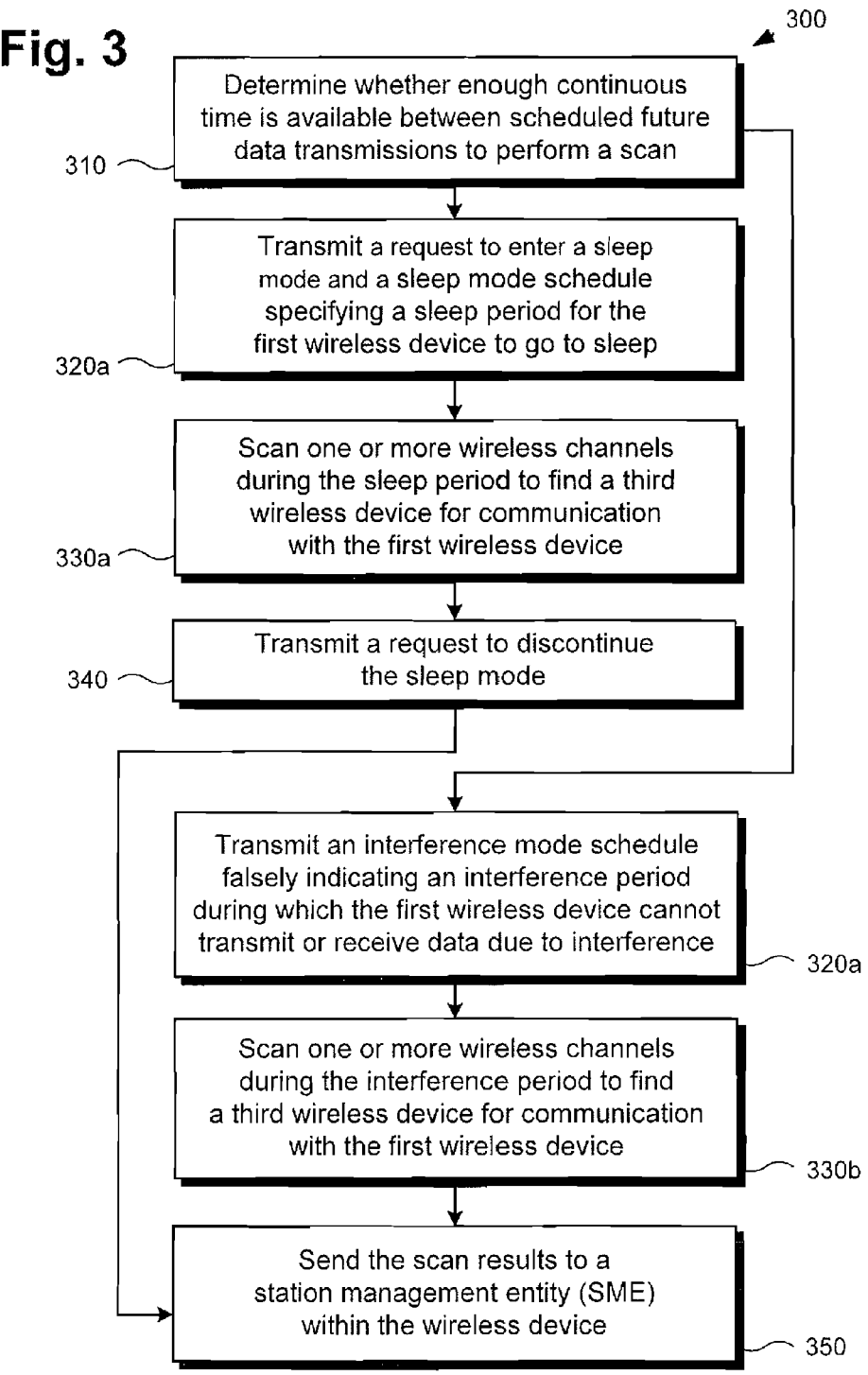

SYSTEM AND METHOD FOR SCANNING WIRELESS CHANNELS

BACKGROUND OF THE INVENTION

1. Field of the Invention

The present invention is generally in the field of electronic circuits and systems. More specifically, the present invention is in the field of communications circuits and systems.

2. Background Art

In the field of wireless communications, 60 GHz technology pursues very high throughput in short-range wireless data transmissions making possible, for example, high-speed communication between multiple wireless devices associated to one another in a communications network. To enable this inherent high-speed communication, each wireless device, or station (STA), within a network must associate itself with a personal basic service set, or PBSS, which is essentially a set of all devices, or stations, that are associated with each other, and thus, can communicate with one another. Within a PBSS, a personal basic service set control point, or PCP, is the device that essentially controls the timing of communications between all devices associated to a particular PBSS.

In order for one wireless STA to associate itself with another wireless STA or PCP, the wireless STA must actively or passively scan for the presence of the other wireless STA or PCP. When a wireless STA is not yet associated to a PCP, i.e., is not part of any PBSS, the wireless STA may perform an active or passive scan any time without hindrance because the wireless STA need not listen for any transmissions from any PCP, nor are any data transmissions scheduled to be sent to or from the wireless STA.

However, if a wireless STA is already associated with a PCP, i.e. is already part of a PBSS and is looking to join another PBSS or PCP/STA not belonging to the associated PBSS, the requisite active or passive scan may be difficult to implement because the associated PCP can schedule data transmissions at any time. If the PCP schedules and transmits data to or from the STA during the active scan, the wireless STA must abort the scan process or suffer the loss of the transmitted data. FIG. 1 shows an exemplary timing diagram representative of data transmission from a PCP during a conventional active scan by an associated wireless STA. FIG. 1 shows a plurality of fixed-length beacon intervals 102, fixed-length time periods during which data transmissions may be scheduled between high-speed devices, shown as the space between two adjacent upward pointing arrows. These beacon intervals (BI) are typically 100 ms in duration. However, one of ordinary skill in the art would appreciate that BI duration may be longer or shorter than this value.

According to this conventional approach, an associated wireless STA may begin an active scan 110 lasting, for example, 2 BI. Each active scan 110 of a particular wireless channel may be separated by an interval 120, during which the associated wireless STA does not perform an active scan. According to the WGA standard, the wireless STA is also typically required to listen for data 130, which may include beacons and/or management frames, for example, from the associated PCP/peer STA each BI. Because some of the data 130 transmitted by an associated PCP/peer STA occurs during a scan interval 110, the data transmitted during those beacons 130 is lost to the wireless STA. Thus, because the wireless STA requires an undisturbed, continuous time period to perform the active scan, it can be very difficult for an already associated wireless STA to perform the active scan without losing concurrently transmitted data. Passive scanning poses similar challenges to active scanning, since a wireless STA must silently scan for beacon transmissions on different channels from neighboring PBSSs, just as during an active scan.

Consequently, there is a need to overcome the drawbacks and deficiencies in the art by providing a scan scheduling solution enabling a wireless device in an associated state to schedule and perform a scan while avoiding the loss of critical data transmitted during the scan.

SUMMARY OF THE INVENTION

The present invention is directed to a system and method for scanning wireless channels, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 3 shows a flowchart describing steps taken to implement a method for active scanning after association for 60 GHz (MAC, according to one or more embodiments of the present invention.

DETAILED DESCRIPTION OF THE INVENTION

Figure 1:
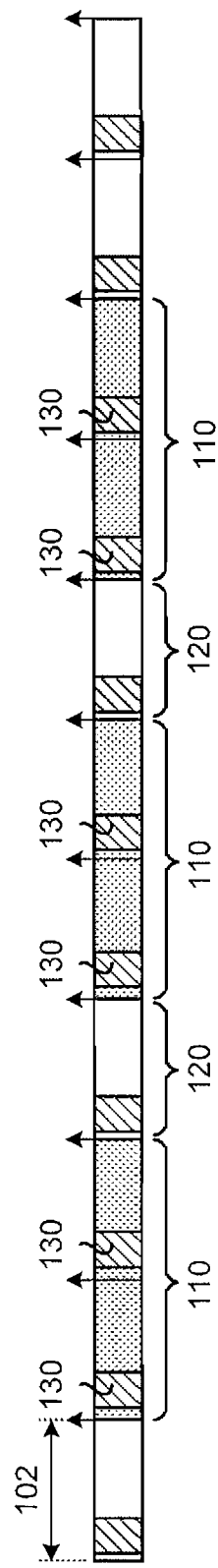
FIG. 1 shows a timing diagram representative of a conventional active scan causing conflicts with data transmissions from an associated device.

The present invention is directed to a system and method for scanning wireless channels. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention.

The drawings in the present application and their accompanying detailed description are directed to merely exemplary embodiments of the invention. To maintain brevity, other embodiments of the present invention are not specifically described in the present application and are not specifically illustrated by the present drawings. It should be understood that unless noted otherwise, like or corresponding elements among the figures may be indicated by like or corresponding reference numerals. Moreover, the drawings and illustrations in the present application are generally not to scale, and are not intended to correspond to actual relative dimensions.

Figure 2:
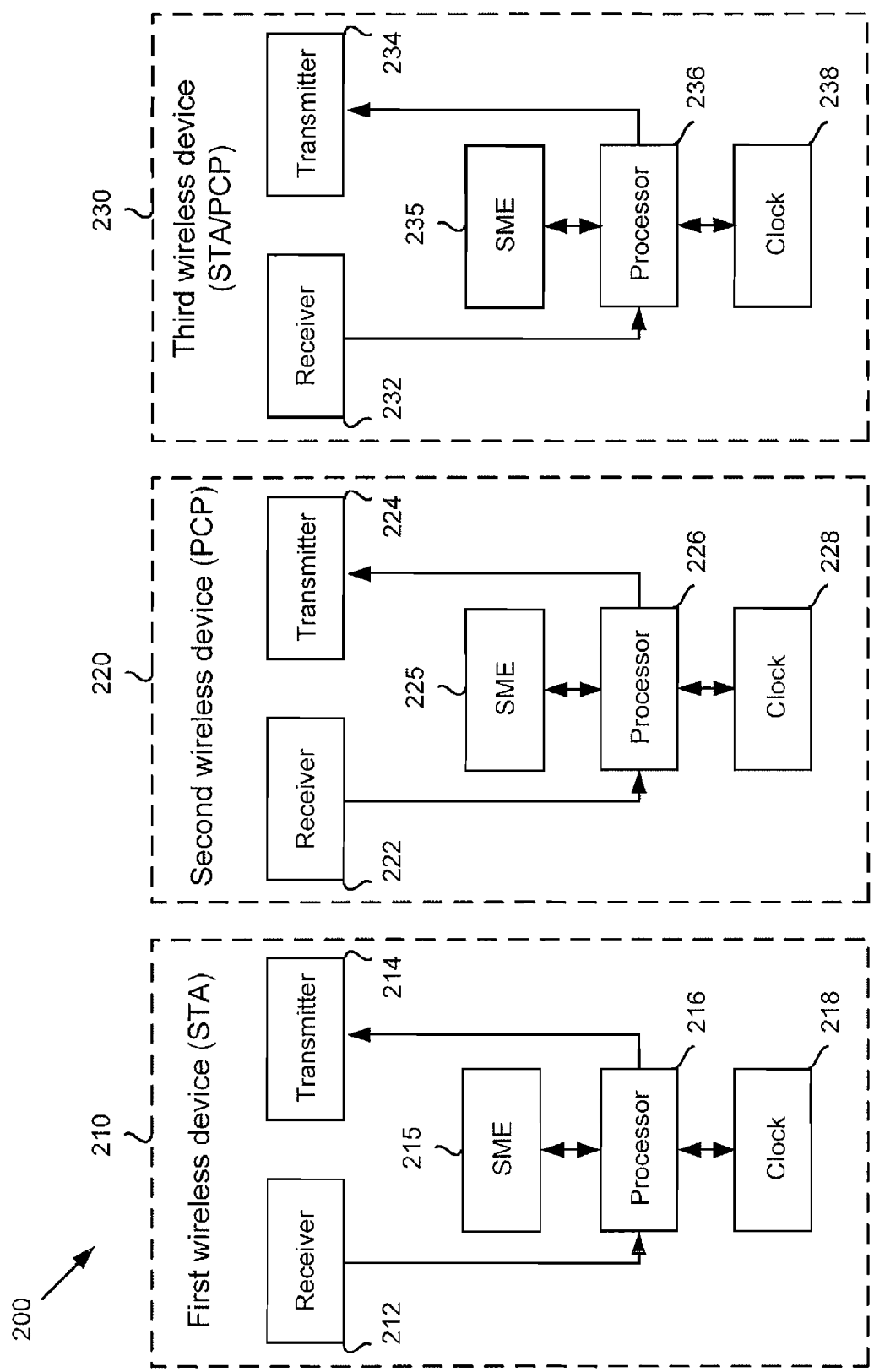
FIG. 2 shows a diagram of a system for active scanning after association for 60 GHz media access control (MAC), according to one embodiment of the present invention.

FIG. 2 shows system 200 for employing a method for scanning after association for 60 GHz MAC, according to one embodiment of the present invention, which is capable of overcoming the drawbacks and deficiencies identified with the conventional art. According to the embodiment of FIG. 2, system 200 is configured to include first wireless device 210, which may be a wireless STA device, second wireless device 220, which may be a wireless PCP device, and third wireless device 230, which may be a wireless STA or PCP device. Requesting Device 210 may comprise receiver 212, processor 216, transmitter 214, station management entity (SME) 215 and clock 215, and may be configured to initiate a sleep mode, also called "power save" mode by specification, or an interference mode with second wireless device 220, for example, in order to perform an uninterrupted active or passive scan of one or more wireless channels to find a third wireless device 230, for example.

Within first wireless device 210, receiver 212 is in communication with processor 216 and may be configured to receive timed data transmissions from another device, for example, second wireless device 220 or third wireless device 230, in the form of multiple service periods, or individual timeframes during which data is transferred, each service period embedded in one or more beacon intervals. Transmitter 214 is also in communication with processor 216 and may be configured to transmit a sleep mode or interference mode schedule to second wireless device 220, for example. A station management entity (SME) 215 may further be in communication with processor 216 and may be configured to manage the operations performed by first wireless device 210. Finally, clock 218 may be in communication with processor 216 and may enable first wireless device 210 to track timing intervals necessary to the operation of one or more embodiments of the present invention.

Likewise, second wireless device 220 may comprise, for example, receiver 222, processor 226, transmitter 224, SME 225 and clock 228, arranged substantially as described above regarding first wireless device 210. Receiver 222 may be configured to receive a sleep mode or interference mode schedule from wireless device 210, for example. Transmitter 224 may be configured to periodically transmit data embedded within one or more beacon intervals to either first wireless device 210 or third wireless device 230, for example. Station management entity (SME) 225 may be configured to manage the operations performed by second wireless device 220, and clock 225 may enable second wireless device 220 to track timing intervals necessary to the operation of one or more embodiments of the present invention.

Finally, third wireless device 230 may comprise, for example, receiver 232, processor 236, transmitter 234, SME 235 and clock 238, arranged substantially as described above regarding first wireless device 210 and second wireless device 220. Receiver 232 may be configured to receive data transmissions corresponding to an active scan from first wireless device 210, for example. Transmitter 234 may be configured to transmit data regarding the active or passive scan to first wireless device 210, for example. Station management entity (SME) 235 may be configured to manage the operations performed by third wireless device 230, and clock 235 may enable third wireless device 230 to track timing intervals necessary to the operation of one or more embodiments of the present invention.

The operation of system 200 will be further described by reference to FIG. 3. FIG. 3 shows a flowchart describing steps taken to implement one or more methods for active or passive scanning after association for 60 GHz MAC, according to one or more embodiments of the present invention. With respect to FIG. 3, it is noted that certain details and features have been left out of flowchart 300 that are apparent to a person of ordinary skill in the art. For example, a step may comprise one or more substeps, as known in the art. While steps 310 through 350 indicated in flowchart 300 are sufficient to describe at least one embodiment of the present method, other embodiments may utilize steps different from those shown in flowchart 300, or may include more, or fewer steps.

According to WGA specification, a scan is initiated by the SME of a wireless device, for example, SME 215 of first wireless device 210. Upon initiation, a wireless device performing an active scan, for example, begins listening for a beacon or beacon frame containing a specific service set identification number (SSID) and returns all beacon and beacon frames matching the desired SSID. If the wireless device, for example first wireless device 210, receives such a beacon or beacon frame, a probe request may be transmitted, essentially asking for the capabilities of the new wireless device, for example, third wireless device 230. The new wireless device may then transmit a probe response, which is received by first wireless device 210, for example. Thus, an active scan may involve listening for beacon frames, transmitting a beacon frame if none is received within a predetermined time period, sending a probe request, and receiving a probe response.

If a wireless STA, for example first wireless device 210, is already associated with a PCP, for example second wireless device 220, i.e. the wireless STA is already part of a PBSS and is looking to join another PBSS or PCP/STA not belonging to the associated PBSS, the requisite active or passive scan may be difficult to implement because the associated PCP can schedule data transmission to or from the wireless STA at any time, the PCP being totally unaware of when the wireless STA is performing an active scan. A peer STA or associated PCP may also send management frames to the scanning STA. If the PCP schedules and transmits data during the active scan, the wireless STA must abort the scan process or suffer the loss of the transmitted data. An example scenario may be a case where a cellular handset associated with, and sending photos or videos to, an HDTV may wish to discover and associate with a printer for printing those photos.

The novel methods disclosed below offer mechanisms through which a wireless STA, for example first wireless device 210, may ensure an associated PCP, for example second wireless device 220, does not schedule any data transmissions to the wireless STA while the wireless STA performs an active or passive scan.

According to the WGA specification, a wireless STA device which is not acting as a PCP or Access Point (AP) may enter a power save mode, allowing the wireless STA to "sleep" during intervals negotiated with the PCP/AP. Each non-PCP/non-AP wireless STA may choose an independent "sleep" interval that fits its own power consumption and traffic delivery requirements. The PCP/AP may then track the sleep intervals of all associated non-PCP/non-AP wireless STAs and deliver traffic to each device only when it is "awake". To set up a power save mode, a sleep mode schedule may be established with the PCP/AP by transmitting a power save configuration (PSC) request to the PCP/AP. Receipt of a PSC response from the PCP/AP indicating a successful sleep mode schedule finalizes the sleep mode schedule.

A first embodiment of the present invention will now be described with reference to FIG. 3. Step 310 of flowchart 300 comprises determining whether enough continuous time is available between scheduled future data transmissions to perform a scan. Referring, for example, to FIG. 2, step 310 may be performed by first wireless device 210 after a scan command is generated by SME 215 within first wireless device 210. If enough time is available based on the schedule of the upcoming BIs, first wireless device 210 may begin an active or passive scan. In the event that enough time is not available to perform a scan, a scan failure event may be send to SME 215, for example, and the scanning process may be aborted or rescheduled for a later time.

Continuing with step 320a of FIG. 3, step 320a comprises transmitting a request to enter a sleep mode and a sleep mode schedule, also called "wakeup schedule" by specification, specifying a sleep period for the first wireless device to go to sleep. According to the embodiment shown in FIG. 2, for example, step 320a may correspond to first wireless device 210 transmitting a sleep mode schedule to second wireless device 220. The sleep mode schedule may be tailored such that it provides a time requirement for scanning the one or more wireless channels by including a start time, duration and periodicity of the sleep mode. Thus, a sleep mode may comprise one or more sleep periods each separated by an awake period. The active or passive scanning of one or more wireless channels may then take place during the one or more sleep periods, instead of the wireless STA device actually going to sleep. During the sleep mode, second wireless device 220 may allocate every $n^{th}$ beacon interval as an "awake" interval where n is the value associated with the periodicity of the sleep mode defined in the sleep mode schedule. It is during these "awake" intervals that first wireless device 210 may receive scheduled future data transmissions from second wireless device 220, for example. Once the scan is complete, the STA may come out of the sleep mode.

In the event that the wireless STA, first wireless device 210 for example, is actually in a power save, i.e. sleep mode, and the sleep duration is aligned with the required scan time of the active or passive scan, the wireless STA need not transmit a new sleep mode schedule. Instead, the wireless STA may perform an active or passive scan during the "sleep" intervals already in effect, according to step 330a described below. However, if the scan time required is greater than, or not aligned with the current sleep duration, the wireless STA may send a modified sleep mode schedule to the PCP, second wireless device 220 for example, to accommodate the required scan time. Once the scan is complete, the original sleep mode schedule may be restored by sending the original sleep mode schedule in a request to the PCP.

Moving to step 330a of FIG. 3, step 330a comprises scanning one or more wireless channels during the sleep period to find a third wireless device for communication with the first wireless device. According to the embodiment shown in FIG. 2, for example, step 330a may be carried out by first wireless device 210. Each wireless channel may be scanned for an integral number of beacon intervals. Thus, wireless device 210 will not enter the negotiated sleep mode, but will instead use the sleep intervals to perform an active or passive scan.

If another wireless STA wants to establish a traffic stream with first wireless device 210 during the sleep mode, the second wireless device 220, acting as the PCP, may send a response including the sleep mode schedule to the another wireless device notifying it that first wireless device 210 is currently asleep, even though first wireless device 210 is not asleep, but instead performing a scan. This method allows first wireless device 210 to do an active or passive scan by avoiding a data or management frame transmission by second wireless device 220, or any other associated device, during the scan time by setting up the sleep mode schedule.

Continuing with step 340 of FIG. 3, step 340 comprises transmitting a request to discontinue the sleep mode. According to the embodiment shown in FIG. 2, for example, step 340 may correspond to first wireless device 210 transmitting a request to second wireless device 220 indicating that the sleep mode is to be discontinued and that first wireless device 210 has now moved to active mode. The PCP, for example second wireless device 220, may then schedule future data transmissions to and from first wireless device 210 during any subsequent beacon interval, as all intervals going forward would now be "awake" intervals.

Step 350 of FIG. 3 comprises sending the scan results to a station management entity (SME) within the wireless device. According to the embodiment shown in FIG. 2, for example, step 350 may correspond to the scan results performed by first wireless device 210 being sent to its own SME 215, which, as previously explained, initiated the original scan command. If the scan discovered another wireless device with which first wireless device 210 may associate, for example third wireless device 230, first wireless device 210 may associate with and begin communicating with third wireless device 230.

According to a second embodiment of the present invention, a Traffic Scheduling Constraint (TSCONST) may be used, similarly to the sleep mode previously described, to ensure that an active or passive scan may be performed, uninterrupted. The TSCONST allows the wireless STA to specify periods of time where poor channel conditions are experienced, such as those due to high levels of interference. In such a case, the wireless STA may include the TSCONST field with a traffic stream add request sent to the PCP for the purpose of interference mitigation. The PCP will use this scheduling constraint in determining future allocations of data transmissions. Thus, any time the wireless STA receives a request to send or receive a data transmission which coincides with the active or passive scan time, the wireless STA may send a traffic stream add request or response to the controlling PCP including the TSCONST field indicating that the wireless STA is experiencing interference even though it is not. This method allows a wireless STA to perform an active or passive scan while avoiding a situation where the PCP schedules data transmissions to or from the wireless STA during the scan time.

A second embodiment of the present invention will now be described with reference to FIG. 3. In the second embodiment, step 310 is performed just as in the first embodiment. Thus, first wireless device 210, for example, may determine whether enough continuous time is available to perform an active or passive scan based on the schedule of data transmissions already scheduled in any upcoming BIs. In the event that enough time is not available to perform a scan, a scan failure event may be sent to SME 215, for example, and the scanning process may be aborted or rescheduled for a later time. If no data transmissions are currently scheduled, or if enough continuous time is available to perform the active or passive scan, first wireless device 210 may begin the active or passive scan as per WGA specification.

Continuing with step 320b of FIG. 3, step 320b comprises transmitting an interference mode schedule specifying or falsely indicating a first interference period indicating that the first wireless device cannot transmit or receive data during the first interference period due to interference. Thus, if during the active or passive scan, first wireless device 210, for example, receives a data transmission add request from second wireless device 220 or another associated wireless device, first wireless device 210 may check if there is a TSCONST matching the scan time of first wireless device 210 included in that request. If not, first wireless device 210 may transmit a rejection response including an interference mode schedule, i.e. a TSCONST. The TSCONST interference mode schedule may provide a time requirement for the active or passive scan of one or more wireless channels including a start time, a duration and a periodicity of the interference schedule, as with the sleep mode schedule of the first embodiment.

In the event that a wireless STA, for example first wireless device 210, is actually experiencing interference and currently has a TSCONST in effect, the wireless STA, first wireless device 210 for example, may add the required scan time to the interference duration, if possible, while responding to a newly arrived traffic stream add request, during the active or passive scan.

Moving to step 330b of FIG. 3, step 330b comprises scanning one or more wireless channels during the first interference period to find a third wireless device for communication with the first wireless device. According to the embodiment shown in FIG. 2, for example, step 330b may correspond to first wireless device 210 performing an active or passive scan during the negotiated interference mode, according to the interference mode schedule indicated to second wireless device 220, in order to find third wireless device 230, for example. Each wireless channel may be scanned for an integral number of beacon intervals during one or more interference periods, each interference period separated by a non-interference period. Thus, wireless device 210 will not itself enter the negotiated interference mode, but will instead use the interference intervals to perform an active or passive scan.

Step 350 of FIG. 3 may be carried out just as in the first embodiment described above, comprising sending the scan results to a station management entity (SME) within the wireless device. According to the embodiment shown in FIG. 2, for example, step 350 may correspond to the scan results performed by first wireless device 210 being sent to its own SME 215. If the scan discovered another wireless device with which first wireless device 210 may associate, for example third wireless device 230, first wireless device 210 may associate with and begin communicating with third wireless device 230.

Figure 4A:
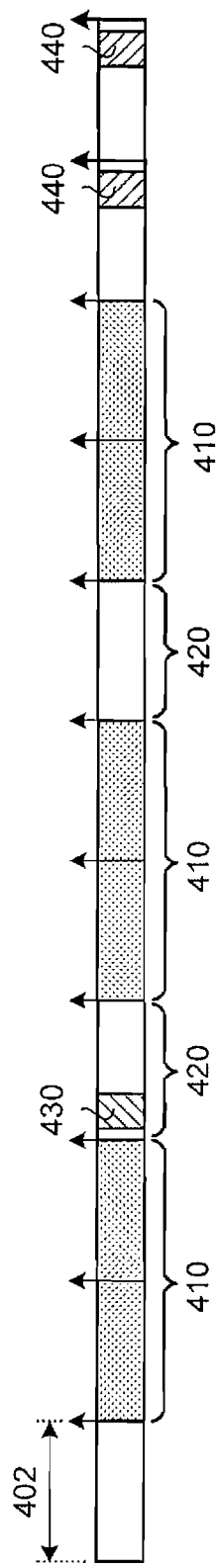
FIGS. 4A and 4B show timing diagrams representative of one or more methods for active scanning after association for 60 GHz MAC, according to one or more embodiments of the present invention.
Figure 4B:
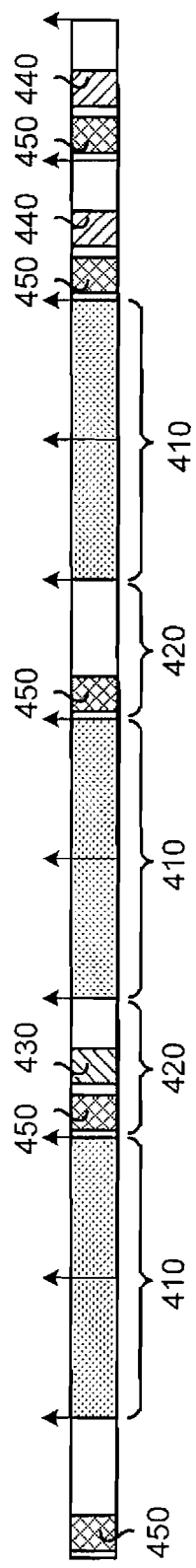

The effect of steps 310 through 350 on timing and allocation, discussed above regarding the first or the second embodiment of the present invention, is shown in FIGS. 4a and 4b. FIG. 4a shows a first timing diagram indicative of a scenario wherein there are no pre-existing traffic streams or service periods scheduled to be transmitted or received by a wireless STA, first wireless device 210 for example, before initiating an active or passive scan. As can be seen in FIG. 4a, each beacon interval 402 is identified as the space between adjacent upward pointing arrows. As previously stated, the sleep mode or interference mode schedule may include a start time, duration and periodicity of the sleep mode or interference mode, respectively. In FIG. 4a, the start time may coincide with the leftmost edge of the first "sleep" or "interference" interval 410. In this example, the sleep mode or interference mode duration would be 2 beacon intervals, as shown by sleep or interference intervals 410. The periodicity would be 3 beacon intervals in this example as shown by every $3^{rd}$ beacon interval being an "awake" or "non-interference" interval 420. Thus, any data transmissions, such as a management frame 430 for example, may be scheduled by the PCP to be transmitted only during one of the awake or non-interference intervals 420. In addition, new traffic streams containing individual service periods 440 may be scheduled by the PCP and allocated to subsequent beacon intervals once the active scan has been terminated.

Similarly, FIG. 4b shows a second timing diagram indicative of a scenario wherein a wireless STA, such as first wireless device 210 for example, has one or more ongoing traffic streams already scheduled before initiation of the active or passive scan. Just as in FIG. 4a, the timing diagram of FIG. 4b shows a sleep mode or interference mode in which the start time may coincide with the leftmost edge of the first sleep or interference interval 410. The sleep or interference mode duration and periodicity are also 2 and 3 beacon intervals, respectively. However, FIG. 4b shows preexisting service periods 450 indicating that data transmissions to or from wireless the STA have already been scheduled prior to the active or passive scan. In this situation, the scan time, coinciding with sleep or interference intervals 410, is chosen to occur between preexisting service periods 450. As in FIG. 4a, new traffic streams containing individual service periods 440 may be scheduled by the PCP and allocated to subsequent beacon intervals once the active or passive scan has been terminated.

Thus, the present invention, according to various embodiments, allows a wireless device in an associated or communication state to schedule and perform an active or passive scan for neighboring PBSSs without disturbing any active or new traffic streams targeted to the device performing the scan. Moreover, the PCP with which the wireless device is associated will be agnostic of this scanning activity and the active or passive scan will occur seamlessly. Conventional methods have been incapable of guaranteeing an undisturbed, continuous time period to perform the active scan while being in an associated or communication state, however, the present invention, according to its various embodiments, addresses and eliminates these issues. Although the present invention is described using 60 GHz wireless systems as an example, the present invention may apply to other wireless systems and is not limited to 60 GHz wireless systems.

From the above description of the invention it is manifest that various techniques can be used for implementing the concepts of the present invention without departing from its scope. Moreover, while the invention has been described with specific reference to certain embodiments, a person of ordinary skill in the art would appreciate that changes can be made in form and detail without departing from the spirit and the scope of the invention. Thus, the described embodiments are to be considered in all respects as illustrative and not restrictive. It should also be understood that the invention is not limited to the particular embodiments described herein but is capable of many rearrangements, modifications, and substitutions without departing from the scope of the invention.

What is claimed is:

1. A method for use by a first wireless device being in a communication state with a second wireless device, the method comprising: transmitting, by the first wireless device, a sleep mode schedule to the second wireless device, the sleep mode schedule specifying a sleep period, wherein during the sleep period the first wifeless device is scheduled to go to sleep; and scanning one or more wireless channels, by the first wireless device, after transmitting the sleep mode schedule and during the sleep period, to find a third wireless device for communication with the first wireless device, wherein the scanning performs an active scan including: listening for a transmission from the third wireless device, and transmitting a beacon frame, by the first wireless device, when no transmission is received from the third wireless device within a predetermined time period.

2. The method of claim 1, wherein the transmitting further includes transmitting a request to enter a sleep mode, and the method further comprising:
communicating, by the first wireless device, during the sleep period, with the third wireless device.

3. The method of claim 1, wherein the sleep mode schedule provides a time requirement for scanning the one or more wireless channels and includes:
a start time of the sleep mode;
a duration of the sleep mode; and
a periodicity of the sleep mode.

4. The method of claim 1, wherein the sleep mode comprises one or more sleep periods each separated by an awake period and the scanning of the one or more channels is performed during the one or more sleep periods.

5. The method of claim 4, further comprising:
receiving scheduled future data transmissions from the second device during each awake period.

6. The method of claim 1, wherein the sleep mode schedule is transmitted in response to a request to initiate the scanning of the one or more wireless channels.

7. A method for use by a first wireless device being in a communication state with a second wireless device, the method comprising:
transmitting, by the first wireless device, a sleep mode schedule to the second wireless device, the sleep mode schedule specifying a sleep period, wherein during the sleep period the first wireless device is scheduled to go to sleep; and
scanning one or more wireless channels, by the first wireless device, after transmitting the sleep mode schedule and during the sleep period, to find a third wireless device for communication with the first wireless device;
wherein the sleep mode schedule transmitted by the first wireless device modifies a duration of an existing sleep mode schedule to align with a time requirement for scanning the one or more wireless channels.

8. A method for use by a first wireless device being in a communication state with a second wireless device, the method comprising: transmitting an interference mode schedule, by the first wireless device to the second wireless device, the interference mode schedule specifying an interference period indicating that the first wireless device cannot transmit or receive data during the interference period due to interference; and scanning one or more wireless channels, by the first wireless device after transmitting the interference mode schedule and during the interference period, to find a third wireless device for communication with the first wireless device, wherein the interference mode schedule transmitted by the first wireless device increases a duration of an existing interference mode schedule to accommodate a time requirement for scanning the one or more wireless channels when the first wireless device is already in an interference mode due to actual interference.

9. The method of claim 8, further comprising:
communicating, by the first wireless device during the interference period, with the third wireless device.

10. The method of claim 8, wherein the interference mode schedule provides a time requirement for scanning the one or more wireless channels and includes:
a start time of the interference mode;
a duration of the interference mode; and
a periodicity of the interference mode.

11. The method of claim 8, wherein the interference mode comprises one or more interference periods each separated by a non-interference period and the scanning of the one or more channels is performed during the one or more interference periods.

12. The method of claim 11, further comprising receiving scheduled future data transmissions from the second device during each non-interference period.

13. The method of claim 8, wherein the scanning performs a passive scan.

14. The method of claim 8, wherein the scanning of the one or more wireless channels is performed for an integral number of beacon intervals for each of the one or more wireless channels scanned.

15. A method for use by a first wireless device being in a communication state with a second wireless device, the method comprising: transmitting an interference mode schedule, by the first wireless device to the second wireless device, the interference mode schedule specifying an interference period indicating that the first wireless device cannot transmit or receive data during the interference period duo to interference; and scanning one or more wireless channels, by the first wireless device after transmitting the interference mode schedule and during the interference period, to find a third wireless device for communication with the first wireless device, wherein the scanning performs an active scan comprising: listening for a transmission from the third wireless device; and transmitting a beacon frame, by the first wireless device, when no transmission is received from the third wireless device within a predetermined time period.

16. A first wireless device comprising: a processor; a transmitter in communication with the processor; a receiver in communication with the processor; the processor configured to: transmit, using the transmitter, a sleep mode schedule to a second wireless device, the sleep mode schedule specifying a sleep period, wherein during the sleep period the first wireless device is scheduled to go to sleep; and scan one or more wireless channels, using the receiver, after transmitting the sleep mode schedule and during the sleep period to find a third wireless device for communication with the first wireless device, wherein scanning performs an active scan including: listening for a transmission from the third wireless device; and transmitting a beacon frame, by the first wireless device, when no transmission is received from the third wireless device within a predetermined time period.

17. The first wireless device of claim 16, wherein the sleep mode comprises one or more sleep periods each separated by an awake period and the scanning of the one or more channels is performed during the one or more sleep periods.

18. The first wireless device of claim 16, wherein transmitting further includes transmitting a request to enter a sleep mode, and the processor is further configured to communicate with the third wireless device during the sleep period.

19. The first wireless device of claim 16, wherein the sleep mode schedule provides a time requirement for scanning the one or more wireless channels and includes:
a start time of the sleep mode;
a duration of the sleep mode; and
a periodicity of the sleep mode.

20. The first wireless device of claim 16, wherein the sleep mode schedule modifies a duration of an existing sleep mode schedule to align with a time requirement for scanning the one or more wireless channels.

* * * * *